(12) United States Patent
Singh et al.

(10) Patent No.: US 10,783,180 B2
(45) Date of Patent: Sep. 22, 2020

(54) TOOL FOR MINING CHAT SESSIONS

(71) Applicant: Bank of America Corporation, Charlotte, NC (US)

(72) Inventors: Mandeep Singh, Medford, MA (US); Xiaofeng Wang, Princeton Junction, NJ (US); Lei Chen, Princeton Junction, NJ (US); Tianyu Feng, Princeton, NJ (US)

(73) Assignee: Bank of America Corporation, Charlotte, NC (US)

( * ) Notice: Subject to any disclaimer, the term of this patent is extended or adjusted under 35 U.S.C. 154(b) by 612 days.

(21) Appl. No.: 15/224,961

(22) Filed: Aug. 1, 2016

(65) Prior Publication Data

US 2018/0032533 A1 Feb. 1, 2018

(51) Int. Cl.
| | |
|---|---|
| G06F 21/45 | (2013.01) |
| G06F 16/35 | (2019.01) |
| H04L 12/58 | (2006.01) |
| H04L 29/08 | (2006.01) |
| G06F 16/33 | (2019.01) |
| G06F 16/9535 | (2019.01) |
| G06F 40/35 | (2020.01) |
| G06F 40/284 | (2020.01) |

(52) U.S. Cl.
CPC ........ G06F 16/355 (2019.01); G06F 16/3334 (2019.01); G06F 16/9535 (2019.01); G06F 40/284 (2020.01); G06F 40/35 (2020.01); H04L 51/16 (2013.01); H04L 51/22 (2013.01); H04L 67/025 (2013.01)

(58) Field of Classification Search
CPC .... G06Q 50/01; G06Q 30/0201; G06F 17/28; G06F 17/218; G06F 17/2765; G06F 17/30663; H04L 51/32

USPC ........ 707/602, 776–778, E17.103, E17.123, 707/724, 725, E17.107, 708, 771, 707/E17.078
See application file for complete search history.

(56) References Cited

U.S. PATENT DOCUMENTS

| | | | | |
|---|---|---|---|---|
| 8,204,809 | B1 * | 6/2012 | Wise | G06Q 40/06 705/35 |
| 8,423,565 | B2 * | 4/2013 | Redlich | G06F 16/951 707/758 |
| 8,595,211 | B1 * | 11/2013 | Satish | G06F 21/51 707/709 |
| 8,676,875 | B1 * | 3/2014 | Smith | H04L 51/32 705/37 |
| 9,928,359 | B1 * | 3/2018 | Vargas | H04L 63/1441 |
| 10,045,156 | B2 * | 8/2018 | Malone | H04W 4/025 |
| 10,417,432 | B2 * | 9/2019 | Mahaffey | G06F 21/577 |

(Continued)

*Primary Examiner* — Alex Gofman
*Assistant Examiner* — Linh Black
(74) *Attorney, Agent, or Firm* — Michael A. Springs

(57) ABSTRACT

A method comprises counting, in a transcript of a chat session between a first user and a second user, for each theme of a plurality of themes, a number of occurrences of each keyword of a plurality of keywords assigned to a theme of a plurality of themes. The method further comprising identifying one or more themes of the chat session based on the number of occurrences of each keyword, counting the number of occurrences of a word of a first set of words and a word of a second set of words in the transcript, and assigning the transcript into a first group or a second group based on the one or more identified themes and the number of occurrences of first words and second words.

20 Claims, 4 Drawing Sheets

(56) References Cited

U.S. PATENT DOCUMENTS

| | | | | |
|---|---|---|---|---|
| 2007/0271220 | A1* | 11/2007 | Carter | G06F 16/9535 |
| 2009/0012826 | A1* | 1/2009 | Eilam | G06Q 30/02 705/7.31 |
| 2010/0250497 | A1* | 9/2010 | Redlich | H04L 63/0227 707/661 |
| 2011/0191372 | A1* | 8/2011 | Kaushansky | G06F 17/30867 707/776 |
| 2013/0047203 | A1* | 2/2013 | Radhakrishnan | G06F 21/335 726/1 |
| 2013/0144951 | A1* | 6/2013 | Viswanath | H04L 29/08 709/204 |
| 2013/0254234 | A1* | 9/2013 | Pierce | G06Q 30/02 707/777 |
| 2014/0195562 | A1* | 7/2014 | Hardeniya | G06Q 30/0256 707/776 |
| 2014/0207518 | A1* | 7/2014 | Kannan | G06Q 30/0201 705/7.29 |
| 2015/0135256 | A1* | 5/2015 | Hoy | H04L 63/20 726/1 |
| 2015/0254566 | A1* | 9/2015 | Chandramouli | G06F 17/27 706/11 |
| 2016/0301639 | A1* | 10/2016 | Liu | G06Q 50/01 |
| 2016/0337364 | A1* | 11/2016 | Grankovskyi | G06Q 10/00 |
| 2017/0018269 | A1* | 1/2017 | Lev | G06F 17/2775 |
| 2017/0195363 | A1* | 7/2017 | Dahan | H04L 63/0281 |
| 2018/0374108 | A1* | 12/2018 | Kannan | G06Q 30/0201 |
| 2018/0375877 | A1* | 12/2018 | Jakobsson | G06F 21/554 |

* cited by examiner

US 10,783,180 B2

TOOL FOR MINING CHAT SESSIONS

TECHNICAL FIELD

This disclosure relates generally to a chat mining tool. More specifically, this disclosure relates to using a chat mining tool to detect social engineering manipulations.

BACKGROUND

The security of information may be threatened by social engineering attempts. Social engineering refers to the psychological manipulation of people into performing certain actions or divulging information. A successful manipulation can result in the disclosure of confidential information including personal information and passwords. Thus, detection of social engineering attempts and prevention of manipulations are important to maintaining the security of information.

SUMMARY OF THE DISCLOSURE

According to one embodiment, a chat mining tool comprises a memory, a theme detecting engine, a tracking engine, and a classification engine. The memory is configured to store a transcript of a chat session between a first user and a second user, a plurality of keywords, wherein each keyword is assigned to a theme of a plurality of themes, and a first set of words and a second set of words. The theme detecting engine is configured to detect one or more themes of the chat session, wherein detecting one or more themes comprises counting, for each theme of the plurality of themes, a number of occurrences in the transcript of each keyword assigned to that theme, and identifying, based on the number of occurrences of each keyword, one or more themes of the chat session. The tracking engine is configured to count the number of occurrences of a word of the first set of words and a word of the second set of words in the transcript and the classification engine is configured to assign the transcript into a first group or a second group based on the one or more detected themes and the number of occurrences of first words and second words.

According to another embodiment, a method comprises counting, in a transcript of a chat session between a first user and a second user, for each theme of a plurality of themes, a number of occurrences of each keyword of a plurality of keywords assigned to a theme of a plurality of themes. The method further comprises identifying one or more themes of the chat session based on the number of occurrences of each keyword, counting the number of occurrences of a word of a first set of words and a word of a second set of words in the transcript, and assigning the transcript into a first group or a second group based on the one or more identified themes and the number of occurrences of first words and second words.

According to yet another embodiment, one or more computer-readable non-transitory storage media embodying software that is operable when executed to count, for each theme of a plurality of themes, in a transcript of a chat session between a first user and a second user, a number of occurrences of each keyword of a plurality of keywords assigned to a theme of a plurality of themes. The software further operable to identify one or more themes of the chat session based on the number of occurrences of each keyword, count the number of occurrences of a word of a first set of words and a word of a second set of words in the transcript, and assign the transcript into a first group or a second group based on the one or more identified themes and the number of occurrences of first words and second words.

Certain embodiments may provide one or more technical advantages. For example, an embodiment of the present disclosure may quickly and automatically identify possible or actual social engineering attempts in chat sessions. As another example, an embodiment of the present disclosure may result in increased safeguarding of confidential or sensitive information. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Embodiments of the present disclosure and its advantages are best understood by referring to FIGS. 1 through 4 of the drawings, like numerals being used for like and corresponding parts of the various drawings.

Maintaining the security of information is important to a number of people. For example, a user may wish to keep personal information confidential (e.g., passwords, account numbers, credit card information). As another example, an entity may be under an obligation to keep personal information secure. Disclosing confidential information to unauthorized persons may result in various consequences including loss to the user (e.g., monetary, identity) and liability for data breach. Accordingly, persons tasked with safeguarding confidential information must be cautious about its disclosure. Additionally, persons tasked with safeguarding confidential information must anticipate fraudulent attempts to gain access to the information.

Generally, social engineers use psychological techniques and tactics to defraud a person of confidential information. For example, a social engineer may attempt to manipulate a person with access to confidential information into providing the confidential information to the social engineer. Popular platforms for social engineers include online chat sessions and telephone calls. Social engineers may exploit a variety of cognitive biases of the person to effectuate their end goal.

This disclosure contemplates a system for predicting or detecting social engineering attempts using a chat mining tool. The chat mining tool is configured to analyze a chat session and predict whether the chat session includes a social engineering attempt that jeopardizes the security of information. For example, the chat mining tool may be configured to predict that a first chat session includes a social engineering attempt by a first user when the first user of a chat session communicates that (1) he is unable to access his account, (2) he needs immediate access to his account, and (3) does not have time to reset the password to his account. A chat mining tool may provide various benefits including early detection of possible social engineering attempts, prevention of loss of confidential information, increased security of information, and decreased exposure to data breach lawsuits. Although this disclosure provides specific details as to using the chat mining tool to detect possible social engineering attempts, this disclosure recognizes using chat mining tool to detect other types of fraud and/or to make other determinations about a chat session.

Figure 1:
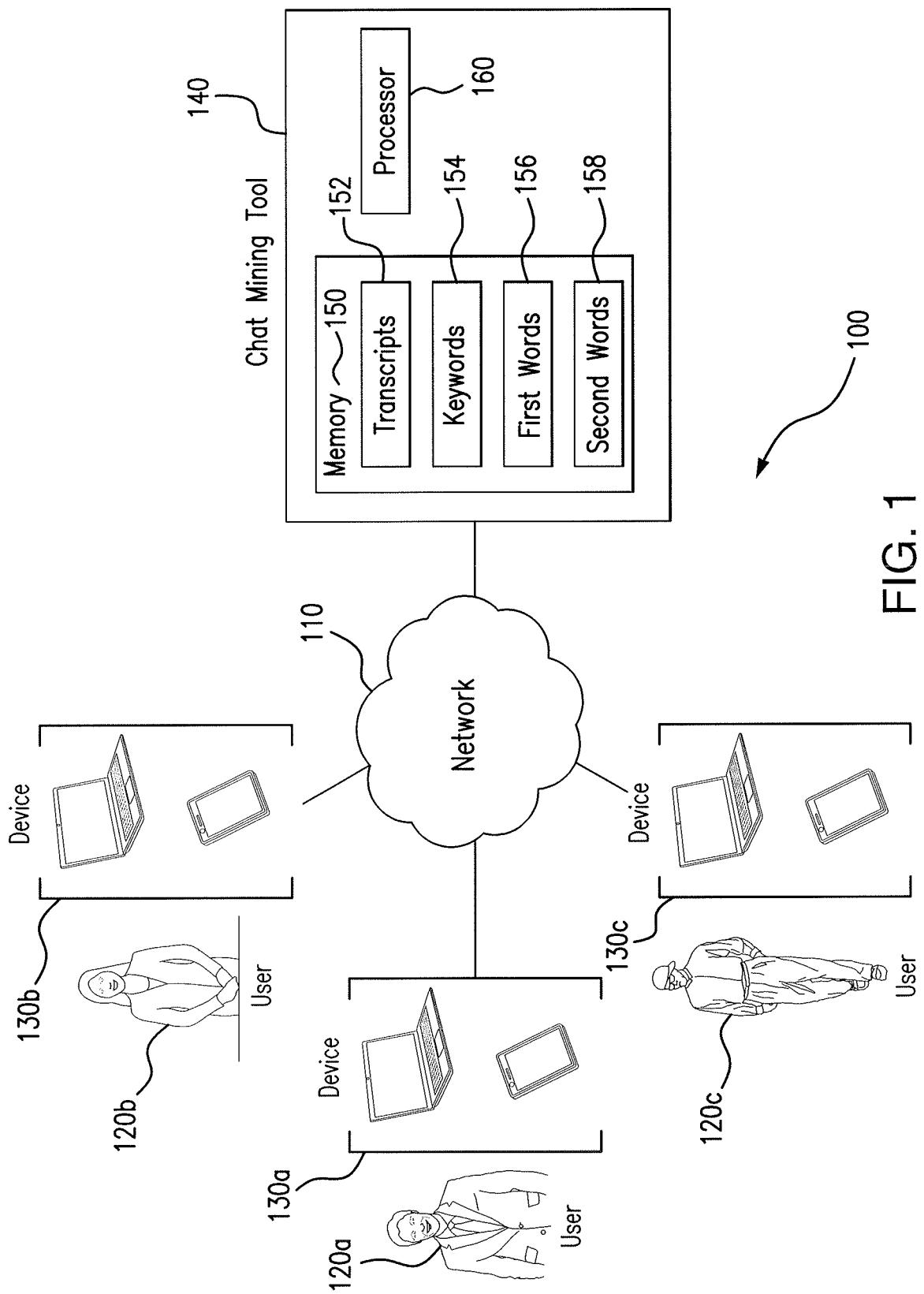
FIG. 1 is a block diagram illustrating a system that includes a chat mining tool, according to certain embodiments of the present disclosure.

FIG. 1 illustrates a system for predicting a social engineering attempt in a chat session using a chat mining tool. System 100 may include a network 110, one or more users 120, one or more devices 130, and chat mining tool 140. In general, chat mining tool 140 may analyze a chat session between two users 120 over network 110 to determine whether the chat session includes a social engineering attempt.

Network 110 may refer to any interconnecting system capable of transmitting audio, video, signals, data, messages, or any combination of the preceding. Network 110 may include all or a portion of a public switched telephone network, a public or private data network, a local area network (LAN), an ad hoc network, a personal area network (PAN), a metropolitan area network (MAN), a wide area network (WAN), a local, regional, or global communication or computer network such as the Internet, an enterprise intranet, or any other suitable communication link, including combinations thereof. One or more portions of one or more of these networks may be wired or wireless. Examples of wireless networks 110 may include a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these.

System 100 may include one or more users 120 in some embodiments. As depicted, system 100 includes users 120a-c. A user 120 may use network 110 to communicate with other users 120. For example, user 120a may communicate with user 120b over network 110. In some embodiments, users 120 communicate with each other in chat sessions which can be initiated from internet browsers (e.g., Internet Explorer, Mozilla Firefox, Safari, Google Chrome) on devices 130. In some embodiments, a user 120 may initiate a chat session with a another user 120 to discuss secure information about a user (e.g., account information and bank information). For example, a user 120a may be a customer of a service and user 120b may be an agent of the service. User 120a may communicate with user 120b to discuss secure information. For example, user 120a may communicate with user 120b in order to add, update or delete secure information about user 120a, and/or to seek secure information (e.g., password or financial information associated with user 120a's account). Because user 120b may have an obligation to protect secure information, user 120b may need to determine the legitimacy of the chat session with user 120a before discussing or divulging any sensitive information regarding user 120a. As used herein, determining the legitimacy of a chat session may include determining whether the chat session includes a social engineering attempt. In some embodiments, the chat session between two users 120 (e.g., user 120a and user 120b) may be legitimate. In other embodiments, the chat session between two users 120 (e.g., user 120c and user 120b) may include a social engineering attempt.

The system 100 may also include one or more devices 130. As depicted in FIG. 1, system 100 includes devices 130a-c. In some embodiments, each device 130 may be associated with a user 120. As depicted, devices 130a are associated with user 120a, devices 130b are associated with user 120b, and devices 130c are associated with user 120c. Each device 130 may be configured to communicate over network 110 with other components of system 100 (e.g., device 130a may communicate, over network 110, with devices 130b-c and chat mining tool 140). In some embodiments, users 120 use devices 130 to communicate with each other in chat sessions. This disclosure contemplates device 130 being any appropriate device that can communicate over network 110. For example, device 130 may be a computer, a laptop, a wireless or cellular telephone, an electronic notebook, a personal digital assistant, a tablet, a server, a mainframe, or any other device capable of receiving, processing, storing, and/or communicating information with other components of system 100. Device 130 may also include a user interface, such as a display, a microphone, keypad, or other appropriate terminal equipment usable by a user. In some embodiments, an application executed by device 130 may perform the functions described herein.

System 100 includes a chat mining tool 140 in some embodiments. Chat mining tool 140 may include a memory 150 and a processor 160. Memory 150 of chat mining tool 140 may be configured to store transcripts 152, keywords 154, a set of first words 156, and a set of second words 158. In some embodiments, transcripts 152 are transcriptions of chat session between a first user (e.g., user 120a) and a second user (e.g., user 120b). As mentioned above, in some embodiments, a user 120 (e.g., user 120c) may use chat sessions as a medium to extract confidential information from other users 120 of system 100. Thus, a transcript 152 of a chat session may embody a social engineering attempt.

Memory 150 of chat mining tool 140 may include a plurality of keywords 154 in some embodiments. Each keyword may be assigned to one or more themes of a plurality of themes. For example, a theme of a chat session may be "forgot password" and the keywords 154 assigned to the "forgot password" theme may include "forgot," "password," "working," "email," "reset," and "help." In some embodiments, keywords 154 assigned to one theme may also be assigned to another theme. For example, keywords 154 assigned to the "forgot password" theme may also be assigned to the "forgot user name" theme. Chat mining tool 140 may include any number of themes. Some themes may correspond to likely types of social engineering attempts (e.g., "forgot password" theme, "forgot username" theme, "bill pay help"). Although this disclosure recognizes that certain themes are more likely to be associated with social engineering attempts, it will be understood that a social engineer may attempt to defraud a user 120 using any suitable theme (e.g., context, scenario, reasoning).

Memory 150 of chat mining tool 140 may also include a set of first words 156. In some embodiments, the set of first words 156 may include words known to be used in social engineering attempts. For example, a common social engineering attempt may inject a sense of urgency and crisis into a chat session. In such case, first words 156 may include "help," "quick," "rush," "now," "time," "emergency," "immediately," and "pressure." As another example, common social engineering attempts include aversions from answering personal questions and/or attempts to steer the conversation. In such situations, first words 156 may include words related to those situations. In some embodiments, first words 156 are predetermined. In some other embodiments, first words 156 are learned over time. This disclosure recognizes that the set of first words 156 may be added to, edited, and/or deleted.

Memory 150 of chat mining tool 140 may also include a set of second words 158. In some embodiments, second words 158 are words typically used in legitimate chat sessions. For example, the second set of words 158 may include "please," "reset," "account," "secondary," "security," and "verify." In some embodiments, second words 158 are predetermined. In some other embodiments, second words 158 are learned over time. This disclosure recognizes that the set of second words 158 may be added to, edited, and/or deleted.

Memory 150 may also include a third set of words (not depicted). In some embodiments, the third set of words are stop words. Stop words may comprise the most common words of a language in some embodiments. In some embodiments, the third set of words are predetermined. In some other embodiments, the third set of words are learned over time. This disclosure recognizes that the set of third words may be added to, edited, and/or deleted.

Chat mining tool 140 includes a processor 160 in some embodiments. Processor 160 may be configured to receive and process the information stored in memory 150 (e.g., transcripts 152, keywords 154, first words 156, and second words 158). In some embodiments, processor 160 may be configured to process the information stored in memory 150 according to the method 300 described below in reference to FIG. 3. In some embodiments, processing the stored information permits chat mining tool 140 to predict whether a user 120 is performing (or has performed) a social engineering attempt in a chat session.

Figure 2:
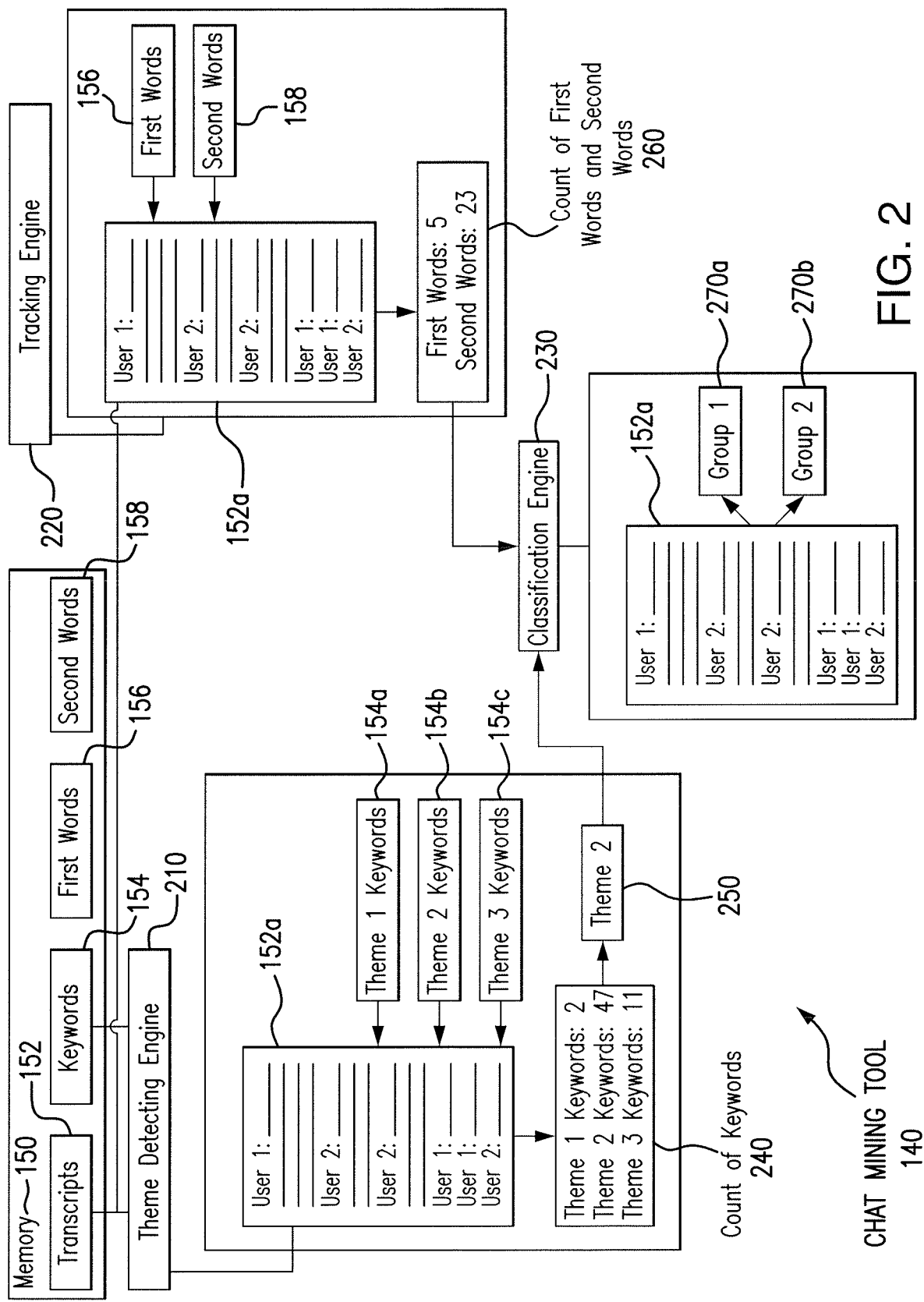
FIG. 2 is a block diagram illustrating the chat mining tool of FIG. 1, according to certain embodiments of the present disclosure.
Figure 3:
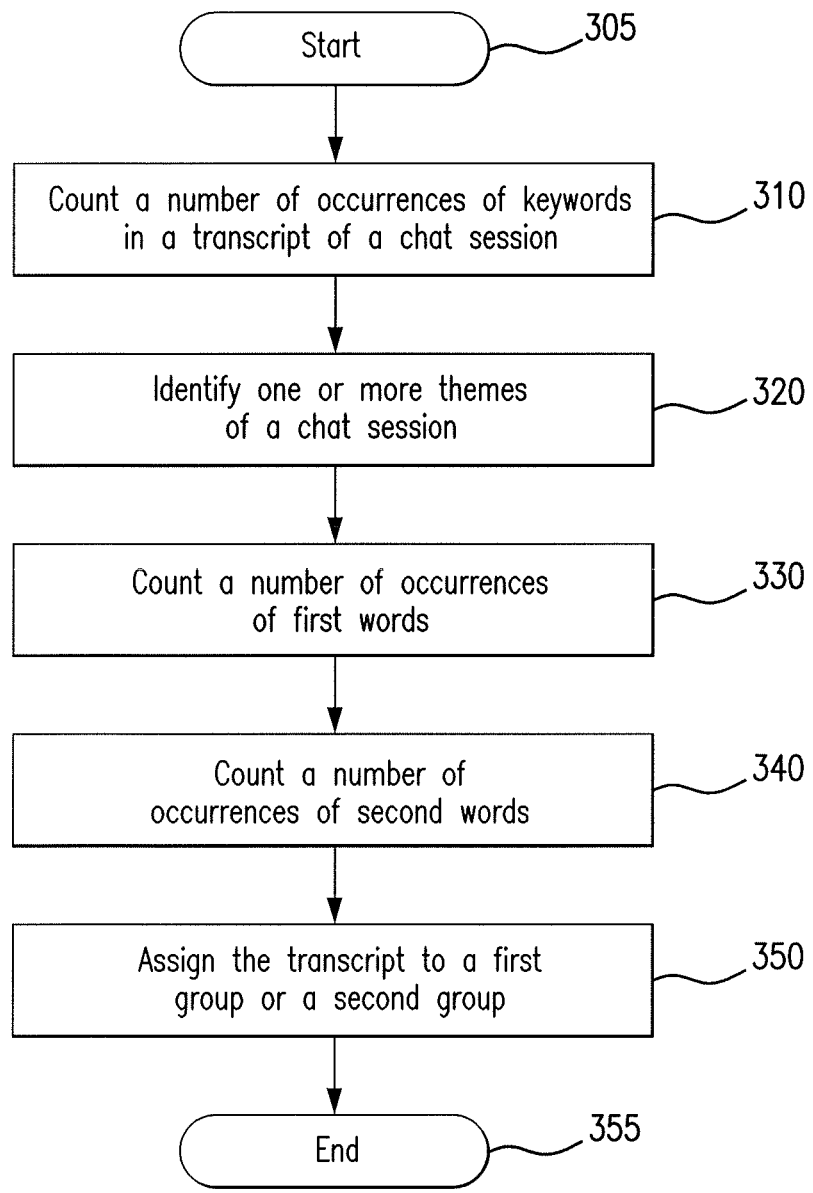
FIG. 3 is a flow chart illustrating a method using the chat mining tool of FIG. 2, according to one embodiment of the present disclosure.
Figure 4:
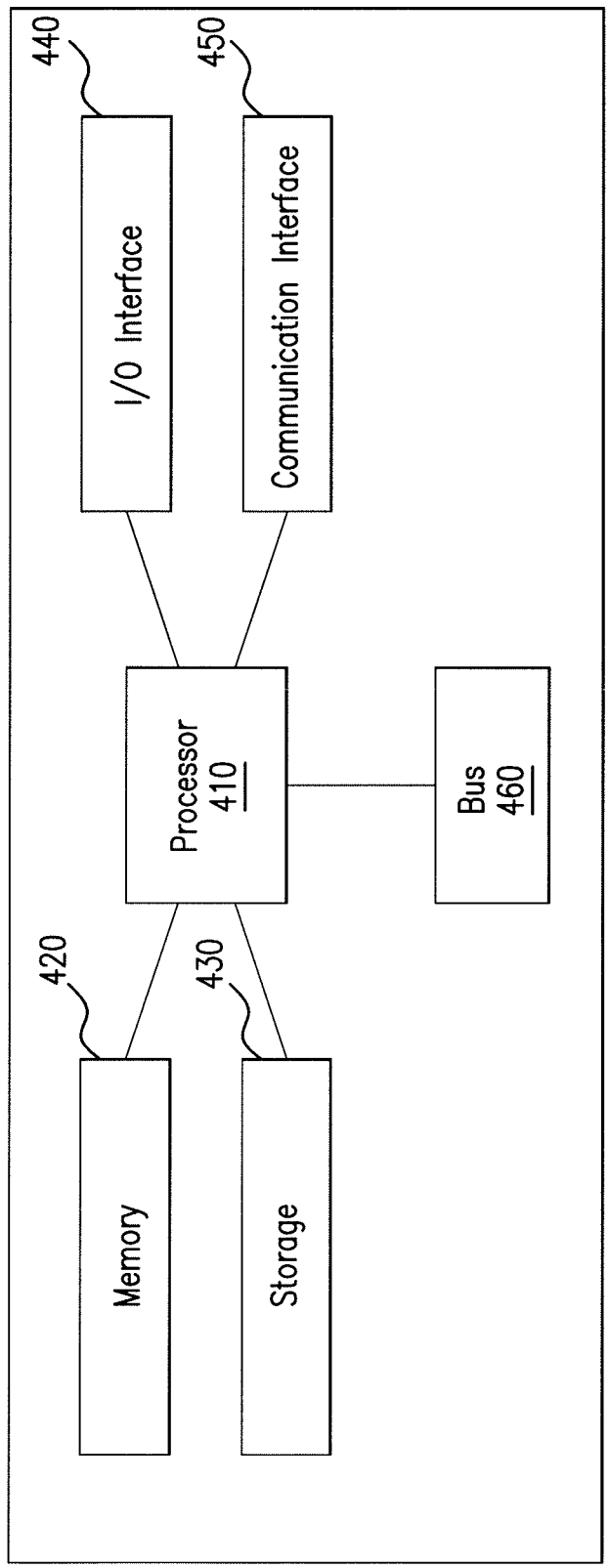
FIG. 4 is a block diagram of a computer operable to execute the chat mining tool of FIG. 2, according to certain embodiments.

Generally, chat mining tool 140 receives a transcript 152 comprising a chat session between users 120, detects one or more themes of the chat session based on keywords 154, tracks the number of occurrences of first words 156 and second words 158 in the transcript, and determines whether the chat session includes a social engineering attempt. In some embodiments, the determination regarding whether the chat session includes a social engineering attempt is based on the theme of the chat session and the number of occurrences of first words 156 and second words 158. FIG. 2 illustrates one embodiment of the chat mining tool 140 of FIG. 1 and FIG. 3 illustrates an embodiment of a method of determining whether a chat session includes a social engineering attempt. Finally, FIG. 4 depicts a computer system that may be configured to execute the steps of method 300 described below in reference to FIG. 3.

FIG. 2 illustrates chat mining tool 140 of FIG. 1. In some embodiments, such as depicted in FIG. 2, chat mining tool 140 includes a theme detecting engine 210, a tracking engine 220, and a classification engine 230. Theme detecting engine 210 may be configured to determine one or more themes of a chat session between a first user 120 and a second user 120. Tracking engine 220 may be configured to count the number of occurrences of first words 156 and second words 158 in a transcript 152 of a chat session. Classification engine 230 may be configured to assign the transcript 152 to a first group 270a or a second group 270b based on the detected theme 250 of a chat session and the number of occurrences of first words 156 and the number of occurrences of second words 158 in the transcript 152. In some embodiments, engines 210, 220, and 230 are executable software that may be executed by processor 160 of FIG. 1. In other embodiments, engines 210, 220, and 230 are hardware. In yet other embodiments, engines 210, 220, and 230 are a combination of software and hardware.

In some embodiments, chat mining tool 140 includes a theme detecting engine 210. As depicted in FIG. 2, theme detecting engine 210 receives a transcript 152a from memory 150. Transcript 152a may be one of a plurality of transcripts 152 stored in memory 150. In some embodiments, transcripts 152 may be transcriptions of chat sessions between two (or more) users 120 of network 110. For example, transcript 152a may be a transcription of a chat session between user 120b and user 120c of network 110. In some embodiments, a user 120 (e.g., user 120c) may attempt to extract sensitive information from another user (e.g., user 120b) using social engineering tactics and/or techniques in a chat session. Thus, transcript 152a may include a social engineering attempt in some embodiments.

As described above, theme detecting engine 210 may be configured to detect one or more themes (e.g., detected theme 250) of a chat session. Detecting a theme of a chat session may, in some embodiments, be based on the number of occurrences of keywords 154 in a chat session (embodied in the transcript 152). A plurality of keywords 154 may be stored in memory 150 of chat mining tool 140 and each of the plurality of keywords may be assigned to one or more themes of a plurality of themes. As used herein, a theme may be a topic or subject of a chat session. For example, chat mining tool 140 may include themes such as "forgot password," "forgot username," "bill pay help," "setup automatic payments," and/or "package not received." Each theme may be associated with a number of keywords 154. In some embodiments, a particular keyword 154 may be assigned to one or more themes. For example, the keyword "help" may be assigned to the "forgot password," "forgot username," "bill pay help," "setup automatic payments," and "package not received" themes.

In some embodiments, theme detecting engine 210 detects one or more themes of the chat session by counting the number of keywords 154 in transcript 152. In some embodiments, theme detecting engine 210 counts the number of occurrences in a transcript 152 of each keyword assigned to each theme. For example, as depicted in FIG. 2, theme detecting engine 210 counts the number of keywords assigned to Theme 1 (154a), the number of keywords assigned to Theme 2, and the number of keywords assigned to Theme 3 (154c) within transcript 152a. As understood by FIG. 2, theme detecting engine 210 counts 2 occurrences of keywords assigned to Theme 1 (154a), counts 47 occurrences of keywords assigned to Theme 2 (154b), and 11 occurrences of keywords assigned to Theme 3 (154c).

In some embodiments, theme detecting engine 210 is configured to count all instances of keywords 154 in transcripts 152. In other embodiments, theme detecting engine 210 is configured to selectively count keywords 154 based on the user 120 who typed the keywords 154 in the chat session. For example, theme detecting engine 210 may only count keywords 154 in transcript 152 from a first user (e.g., user 120a). As another example, theme detecting engine 210 may only count keywords 154 in transcript 152 from a second user (e.g., user 120b).

Detecting a theme of a chat session may include identifying one or more themes of a chat session based on the number of occurrences of each keyword 154. Theme detecting engine 210 identifies one or more themes of a chat session based on the number of occurrences of each keyword 154 in some embodiments. For example, as depicted in FIG. 2, theme detecting engine 210 identifies Theme 2 as the theme of the chat session transcribed in transcript 152a. Although this disclosure describes and depicts theme detecting engine 210 identifying a single theme for the chat session of transcript 152a, this disclosure recognizes that theme detecting engine 210 may detect any suitable number of themes for a given chat session. For example, user 120a may have forgotten both his password and his username and discusses both in a chat session with user 120b. In such an example, theme detecting engine 210 may detect the "forgot password" and "forgot username" theme within the transcript embodying the chat session between user 120a and user 120b.

In some embodiments, theme detecting engine 210 identifies one theme as detected theme 250 by determining which theme corresponds to the theme with the most number of occurrences of keywords 154. For example, as depicted in FIG. 2, theme detecting engine 210 determines that the theme of the chat session of transcript 152a is Theme 2 because keywords assigned to Theme 2 (154b) occurred more than keywords 154 assigned to every other theme (154a, 154c). As shown in the count of keywords 240, keywords 154 assigned to Theme 2 occurred most in transcript 252a. In some other embodiments, theme detecting engine 210 identifies a theme as a detected theme 250 based on a threshold. For example, theme detecting engine 210 may determine that a chat session includes a theme when there are more than ten occurrences of a keyword 154 assigned to a theme. In such example, theme detecting engine 210 may detect that the themes of the chat session of transcript 152a are Theme 2 and Theme 3.

An example algorithm for theme detecting engine 210 is as follows: Wait for transcript of a chat session; receive transcript of the chat session; count a number of occurrences of keywords assigned to a first theme; count a number of occurrences of keywords assigned to a second theme; count a number of occurrences of keywords assigned to a third theme; identify which theme corresponds to the theme with the greatest number of occurrences of keywords; and determine that the theme of the chat session is the identified theme.

Chat mining tool 140 includes a tracking engine 220 in some embodiments. Tracking engine 220 may be configured to track (e.g., by counting) the number of occurrences of first words 156 and second words 158 in a transcript 152 of a chat session. In some embodiments, memory 150 includes a plurality of first words 156 and a plurality of second words 158. Tracking engine 220 may count the number of occurrences of first words 156 within a transcript (e.g., transcript 152a). Tracking engine 220 may also count the number of occurrences of second words 158 in the transcript (e.g., 152a). In some embodiments, the plurality of first words 156 are words that are typically used in social engineering attempts. In some embodiments, the plurality of second words 158 are words typically used in legitimate chat sessions.

In some embodiments, tracking engine 220 tracks all occurrences of first words 156 and second words 158 in transcript 152. In other embodiments, tracking engine 220 selectively tracks the number of occurrences of first words 156 and second words 158 based on the user 120 associated with the first words 156 and second words 158 (e.g., user 120 who typed the first words 156 and/or second words 158 in a chat session). For example, tracking engine 220 may only count the occurrences of first words 156 and/or second words 158 typed by user 120c in a chat session.

As depicted in FIG. 2, tracking engine 220 receives a transcript 152, first words 156, and second words 158 from memory 150. As described above, tracking engine 220 may be configured to track the number occurrences of first words 156 and second words 158 in a transcript 152. As shown in FIG. 2, tracking engine 220 counts the number of occurrences of first words 156 and the number of occurrences of second words 158 that appear in transcript 152a (e.g., count of first words and second words 260). As illustrated in the count of first words and second words 260 of FIG. 2, tracking engine 220 counts 5 occurrences of first words 156 and 23 occurrences of second words 158 in transcript 152a.

An example algorithm for tracking engine 220 is as follows: Wait for transcript of a chat session; receive transcript of the chat session; count a number of occurrences of words of first set of words in transcript; and count a number of occurrences of words of second set of words in transcript.

Chat mining tool 140 may include a classification engine 230 in some embodiments. Classification engine 230 may be configured to assign (or classify) a transcript 252 to a first group 270a or a second group 270b. In some embodiments, the assignment by classification engine 230 corresponds to a determination that a particular chat session includes a social engineering attempt. For example, assigning a transcript 152 to Group 1 may correspond to a determination that that particular transcript includes a social engineering attempt.

In some embodiments, assigning a transcript 152 to a particular group is based on the detected one or more themes 250 of a chat session and the count of first words and second words 260. In other embodiments, assigning a transcript 152 to a particular group may be based on other factors including the geographical location of a user 120, a duration of the chat session, an engagement indication, a termination indication and/or an identification of a user 120. For example, in some embodiments, classification engine 230 may be more likely to assign a transcript 152 to a particular group 270 when the geographical location of a user 120 is identified as a geographical location with a high crime tendency. As other examples, a short duration of a chat session or a particular browser type may indicate an increased likelihood that a transcript 152 should be assigned to a particular group 270. As yet other examples, an engagement indication (e.g., an indication of how a user 120 initiated a chat session), a termination indication (e.g., an indication of which user 120 terminated a chat session), and/or an identification of a particular user 120 (e.g., an identity of a user 120) in a chat session may correspond to an increased likelihood that a transcript 152 should be assigned to a particular group 270.

As depicted in FIG. 2, classification engine 230 receives the (one or more) detected theme 250 from theme detecting engine 210 and the count of first words and second words 260 from tracking engine 220 and determines to assign transcript 152a to Group 1 (270a) or Group 2 (270b). In this particular embodiment, if classification engine 230 assigns transcript 152a to Group 1 (270a), transcript 152a may be determined to include a social engineering attempt. Alternatively, if classification engine 230 assigns transcript 152a to Group 2 (270b), transcript 152a may be determined to not include a social engineering attempt (e.g., be a legitimate chat session).

In some embodiments, transcripts 152 assigned to a particular group (e.g., Group 1 270a) may be tagged for further review. In other embodiments, if a transcript 152a is assigned to a particular group 270 (e.g., Group 1 270a), a user 120 of the corresponding chat session is alerted to a possible social engineering attempt. For example, upon detection by chat mining tool 140 that a first chat session includes a possible social engineering attempt, user 120*b* (a user 120 that is part of first chat session) may be alerted of the possible social engineering attempt.

An example algorithm for classification engine 230 is as follows: Wait for transcript of a chat session; wait for a determined theme of the chat session; wait for an identification of suspicious themes; wait for a count of the number of occurrences of words of first set of words in transcript; wait for a count of the number of occurrences of words of second set of words in transcript; receive transcript of the chat session; receive determined theme of chat session; receive an identification of suspicious themes; receive a count of the number of occurrences of words of first set of words in transcript; receive a count of the number of occurrences of words of second set of words in transcript; determine whether the determined theme of the chat session is one of the themes identified as suspicious; if the determined theme of the chat session is one of the themes identified as suspicious, determine whether the number of occurrences of words of first set of words in transcript is greater than a threshold; if the number of occurrences of words of first set of words in transcript is greater than the threshold, determine whether the number of occurrences of words of first set of words is greater than the number of occurrences of words of second set of words; if the number of occurrences of words of first set of words is greater than the number of occurrences of words of second set of words, assign transcript to a first group.

Chat mining tool 140 includes a text processing engine (not depicted) in some embodiments. The text processing engine may be configured to process the text in a transcript 152. For example, the text processing engine may be configured to correct errors in the text of the transcript 152 (e.g., correct spelling errors of users 120 in a chat session), to grammatically tag each word in the text (e.g., identify the part-of-speech of each word in the chat session), to remove each occurrence of a stop word (e.g., the most common words in a language), and/or to extract the stem of each word in the text.

An example algorithm for the text processing engine is as follows: Wait for transcript of a chat session; receive transcript of a chat session; identify spelling and/or grammatical errors in transcript; correct spelling and/or grammatical errors in transcript; identify part-of-speech of each word in transcript, tag each word in transcript based on the identification of the part-of-speech; wait for an identification of third words; receive an identification of third words; identify each occurrence of a third word in transcript; remove each identified occurrence of a third word from transcript; identify the stem of each word in transcript; and extract the identified stem of each word in transcript.

FIG. 3 illustrates a method of predicting a social engineering attempt in a chat session. The method 300 may begin in a step 305 and continue to a step 310. At step 310, chat mining tool 140 may count, for each theme of a plurality of themes, a number occurrences of keywords 154 in a transcript of a chat session. In some embodiments, keywords 154 are stored in memory 150 of chat mining tool 140. Keywords 154 are assigned to one or more themes in some embodiments. For example, the key word "help" may be assigned to the "forgot password" and "forgot username" theme. As a result, chat mining tool 140 may count one occurrence of that key word for both the "forgot password" and "forgot username" themes. In some embodiments, chat mining tool 140 may count the total number of occurrences of keywords 154 in a chat session. In other embodiments, chat mining tool 140 may selectively count the number of occurrences of keywords 154 in a chat session (e.g., chat mining tool 140 counts only number of occurrences of keywords 154 typed by one user 120 in a chat session). In some embodiments, the method 300 continue to a step 320.

At step 320, chat mining tool 140 identifies (detects) one or more themes of a chat session of a transcript 152. In some embodiments, the one or more themes are identified by theme detecting engine 210. The identification of the one or more themes may be based on the occurrences of keywords 154 in some embodiments. For example, chat mining tool 140 may detect one or more themes of a chat session (e.g., detected theme 250) based on the number of occurrences of keywords 154 in a transcript 152. In some embodiments, identifying one or more themes of a chat session is based on a threshold. In other embodiments, identifying a theme of a chat session comprises determining which theme corresponds to the theme with the most number of occurrences of keywords 154. In some embodiments, the method 300 may continue to a step 330.

At step 330, chat mining tool 140 counts the number of occurrences of first words 156. In some embodiments, such as depicted in FIG. 2, tracking engine 220 counts the number of occurrences of first words 156 in a transcript 152. First words 156 may be words indicating a social engineering attempt in some embodiments. Chat mining tool 140 may count the total number of first words 156 in transcript 152 in some embodiments. In other embodiments, chat mining tool 140 selectively counts the number of first words 156 in a transcript 152 (e.g., first words 156 associated with a particular user 120 in a chat session). In some embodiments, the method 300 continues to a step 340.

At step 340, chat mining tool 140 counts the number of occurrences of second words 158. In some embodiments, such as depicted in FIG. 2, tracking engine 220 counts the number of occurrences of second words 158 in a transcript 152. In some embodiments, second words 158 may be words used in legitimate chat sessions. Chat mining tool 140 may count the total number occurrences of second words 158 in a transcript 152 and/or selectively count the number of second words 158 in a transcript 152 (e.g., second words 158 associated with a particular user 120 in a chat session). In some embodiments the method 300 continues to step 350.

At step 350, chat mining tool 140 assigns transcript 252 to a first group (e.g., Group 1 270*a*) or a second group (e.g., Group 2 270*b*). Assignment of transcript 252 to a particular group 270 may be performed by classification engine 230. In some embodiments, assigning the transcript to a group 270 is based on the one or more detected themes 250 of a chat session and the number of occurrences of first words and second words 260 within transcript 152. Assignment to a particular group 270 may indicate whether a chat session includes a social engineering attempt. For example, assigning transcript 252 to the first group (e.g., Group 1 270*a*) may indicate that transcript 252 includes (or may include) a social engineering attempt. In such example, assigning transcript 252 to the second group (e.g., Group 2 270*b*) may indicate that transcript 152 does not include a social engineering attempt.

In some embodiments, chat mining tool 140 may determine to assign transcript 252 to a particular group 270 based on other variables. For example, classification engine 230 may take into account the geographical location of the first user, the duration of the chat session, the type of browser used by a participant of the chat session (a user 120), a page loading time, an engagement indication, a termination, and/or an identification of a particular user 120 in a chat session.

Although this disclosure describes particular variables that may weigh in favor of (or against) a determination to assign transcript 152 to a particular group 270, this disclosure recognizes chat mining tool 140 may account for any suitable variable. In some embodiments, after assigning transcript 152 to a particular group 270, the method 300 may continue to an end step 355.

FIG. 4 illustrates an example of a computer system 400. In some embodiments, chat mining tool 140 is a program that is implemented by a processor of a computer system such as computer system 400. Computer system 400 may be any suitable computing system in any suitable physical form. In some embodiments, computer system 400 may be device 130. As example and not by way of limitation, computer system 400 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, a mainframe, a mesh of computer systems, a server, an application server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

One or more computer systems 400 may perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As an example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

Computer system 400 may include a processor 410, memory 420, storage 430, an input/output (I/O) interface 440, a communication interface 450, and a bus 460 in some embodiments, such as depicted in FIG. 7. Although this disclosure describes and illustrates a particular computer system having a particular number of particular components in a particular arrangement, this disclosure contemplates any suitable computer system having any suitable number of any suitable components in any suitable arrangement.

Processor 410 includes hardware for executing instructions, such as those making up a computer program, in particular embodiments. For example, processor 410 may execute chat mining tool 140 and/or any engines (e.g., theme detecting engine 210, tracking engine 220, classification engine 230 and/or processing engine) of chat mining tool 140. As an example and not by way of limitation, to execute instructions, processor 410 may retrieve (or fetch) the instructions from an internal register, an internal cache, memory 420, or storage 430; decode and execute them; and then write one or more results to an internal register, an internal cache, memory 420, or storage 430. In particular embodiments, processor 410 may include one or more internal caches for data, instructions, or addresses. This disclosure contemplates processor 410 including any suitable number of any suitable internal caches, where appropriate. As an example and not by way of limitation, processor 410 may include one or more instruction caches, one or more data caches, and one or more translation lookaside buffers (TLBs). Instructions in the instruction caches may be copies of instructions in memory 420 or storage 430, and the instruction caches may speed up retrieval of those instructions by processor 410. Data in the data caches may be copies of data in memory 420 or storage 430 for instructions executing at processor 410 to operate on; the results of previous instructions executed at processor 410 for access by subsequent instructions executing at processor 410 or for writing to memory 420 or storage 430; or other suitable data. The data caches may speed up read or write operations by processor 410. The TLBs may speed up virtual-address translation for processor 410. In particular embodiments, processor 410 may include one or more internal registers for data, instructions, or addresses. This disclosure contemplates processor 410 including any suitable number of any suitable internal registers, where appropriate. Where appropriate, processor 410 may include one or more arithmetic logic units (ALUs); be a multi-core processor; or include one or more processors 175. Although this disclosure describes and illustrates a particular processor, this disclosure contemplates any suitable processor.

Memory 420 may include main memory for storing instructions for processor 410 to execute or data for processor 410 to operate on. As an example and not by way of limitation, computer system 400 may load instructions from storage 430 or another source (such as, for example, another computer system 400) to memory 420. Processor 410 may then load the instructions from memory 420 to an internal register or internal cache. To execute the instructions, processor 410 may retrieve the instructions from the internal register or internal cache and decode them. During or after execution of the instructions, processor 410 may write one or more results (which may be intermediate or final results) to the internal register or internal cache. Processor 410 may then write one or more of those results to memory 420. In particular embodiments, processor 410 executes only instructions in one or more internal registers or internal caches or in memory 420 (as opposed to storage 430 or elsewhere) and operates only on data in one or more internal registers or internal caches or in memory 420 (as opposed to storage 430 or elsewhere). One or more memory buses (which may each include an address bus and a data bus) may couple processor 410 to memory 420. Bus 460 may include one or more memory buses, as described below. In particular embodiments, one or more memory management units (MMUs) reside between processor 410 and memory 420 and facilitate accesses to memory 420 requested by processor 410. In particular embodiments, memory 420 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 420 may include one or more memories 180, where appropriate. Although this disclosure describes and illustrates particular memory, this disclosure contemplates any suitable memory.

Storage 430 may include mass storage for data or instructions. As an example and not by way of limitation, storage 430 may include a hard disk drive (HDD), a floppy disk drive, flash memory, an optical disc, a magneto-optical disc, magnetic tape, or a Universal Serial Bus (USB) drive or a combination of two or more of these. Storage 430 may include removable or non-removable (or fixed) media, where appropriate. Storage 430 may be internal or external to computer system 400, where appropriate. In particular embodiments, storage 430 is non-volatile, solid-state memory. In particular embodiments, storage 430 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 430 taking any suitable physical form. Storage 430 may include one or more storage control units facilitating communication between processor 410 and storage 430, where appropriate. Where appropriate, storage 430 may include one or more storages 140. Although this disclosure describes and illustrates particular storage, this disclosure contemplates any suitable storage.

I/O interface 440 may include hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 185 for them. Where appropriate, I/O interface 440 may include one or more device or software drivers enabling processor 410 to drive one or more of these I/O devices. I/O interface 440 may include one or more I/O interfaces 185, where appropriate. Although this disclosure describes and illustrates a particular I/O interface, this disclosure contemplates any suitable I/O interface.

Communication interface 450 may include hardware, software, or both providing one or more interfaces for communication (such as, for example, packet-based communication) between computer system 400 and one or more other computer systems 400 or one or more networks (e.g., network 110). As an example and not by way of limitation, communication interface 450 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 450 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 450 for any of these networks, where appropriate. Communication interface 450 may include one or more communication interfaces 190, where appropriate. Although this disclosure describes and illustrates a particular communication interface, this disclosure contemplates any suitable communication interface.

Bus 460 may include hardware, software, or both coupling components of computer system 400 to each other. As an example and not by way of limitation, bus 460 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 460 may include one or more buses 212, where appropriate. Although this disclosure describes and illustrates a particular bus, this disclosure contemplates any suitable bus or interconnect. The components of computer system 400 may be integrated or separated. In some embodiments, components of computer system 400 may each be housed within a single chassis. The operations of computer system 400 may be performed by more, fewer, or other components. Additionally, operations of computer system 400 may be performed using any suitable logic that may comprise software, hardware, other logic, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the embodiments described or illustrated herein that a person having ordinary skill in the art would comprehend. The scope of this disclosure is not limited to the embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A chat mining tool comprising:
a memory configured to store:
a transcript of a chat session between a first user and a second user;
a plurality of keywords, each keyword assigned to a theme of a plurality of themes; and
a first set of words and a second set of words, wherein the first set of words indicate a social engineering attempt and the second set of words indicate a legitimate chat session; and
a hardware processor communicatively coupled to the memory, the hardware processor configured to:
implement a text processing engine, the text processing engine configured to process the text in the transcript, wherein processing the text comprises extracting a stem of each word in the text;
implement a theme detecting engine, the theme detecting engine configured to automatically detect one or more themes of the chat session, the one or more themes of the chat session comprising a "forgot password" theme, a "forgot username" theme, and a "bill pay help" theme, wherein detecting one or more themes comprises:
for each theme of the plurality of themes, counting a number of occurrences in the transcript of each keyword assigned to that theme; and
based on a comparison of the number of occurrences of each keyword to a first threshold, identifying one or more themes of the chat session;
implement a tracking engine, the tracking engine configured to count the number of occurrences of a word of the first set of words and a word of the second set of words in the transcript; and
implement a classification engine, the classification engine configured to:
assign the transcript into a first group or a second group, wherein assigning the transcript to the first group indicates that the transcript comprises an attempt by the first user to extract at least one of a piece of identification information of a third user or a piece of financial information of the third user from the second user, wherein the third user has not authorized the first user to access the at least one of the piece of identification information or the piece of financial information, the assignment based on:
the one or more detected themes;
a comparison of the number of occurrences of first words to a second threshold;
a comparison of the number of occurrences of second words to the second threshold;
a comparison of the number of occurrences of first words to the number of occurrences of second words;
an identification of a geographical location of the first user as at least one of a location with a high crime tendency and a location without a high crime tendency;
a duration of the chat session;
a type of browser used by the first user to chat with the second user;
a page loading time;
an engagement indication of how the first user initiated the chat session with the second user;
a termination indication of whether the first user or the second user terminated the chat session; and
an identification of the second user; and
in response to assigning the transcript to the first group, transmit an alert to the second user.

2. The chat mining tool of claim 1, wherein:
the memory is further configured to store a third set of words; and
processing the text further comprises one or more of:
correcting errors in the text;
grammatically tagging each word in the text; and
removing from the text each occurrence of a word of the third set of words.

3. The chat mining tool of claim 2, wherein the third set of words comprises stop words.

4. The chat mining tool of claim 1, wherein the plurality of keywords comprises at least one of "help," "quick," "rush," "now," "time," "emergency," "immediately," and "pressure."

5. The chat mining tool of claim 1, wherein the theme detecting engine is further configured to detect one or more themes of the transcript based on the text from only the second user in the transcript and the plurality of keywords for each theme of the plurality of themes.

6. The chat mining tool of claim 1, wherein the tracking engine is further configured to count the number of first words and second words from only the first user in the transcript.

7. The chat mining tool of claim 1, wherein the plurality of keywords comprises words relating to at least one of an aversion from answering personal questions and an attempt to steer a conversation.

8. A method comprising:
processing text in a transcript of a chat session between a first user and a second user, wherein processing the text comprises extracting a stem of each word in the text;
for each theme of a plurality of themes, counting, in the transcript, a number of occurrences of each keyword of a plurality of keywords assigned to a theme of a plurality of themes, wherein the plurality of themes comprises a "forgot password" theme, a "forgot username" theme, and a "bill pay help" theme;
automatically identifying one or more themes of the chat session based on a comparison of the number of occurrences of each keyword to a first threshold;
counting the number of occurrences of a word of a first set of words and a word of a second set of words in the transcript, wherein the first set of words indicate a social engineering attempt and the second set of words indicate a legitimate chat session; and
assigning the transcript into a first group or a second group, wherein assigning the transcript to the first group indicates that the transcript comprises an attempt by the first user to extract at least one of a piece of identification information of a third user or a piece of financial information of the third user from the second user, wherein the third user has not authorized the first user to access the at least one of the piece of identification information or the piece of financial information, the assignment based on:
the one or more identified themes;
a comparison of the number of occurrences of first words to a second threshold;
a comparison of the number of occurrences of second words to the second threshold;
a comparison of the number of occurrences of first words to the number of occurrences of second words;
an identification of a geographical location of the first user as at least one of a location with a high crime tendency and a location without a high crime tendency;
a duration of the chat session;
a type of browser used by the first user to chat with the second user;
a page loading time;
an engagement indication of how the first user initiated the chat session with the second user;
a termination indication of whether the first user or the second user terminated the chat session; and
an identification of the second user; and
in response to assigning the transcript to the first group, transmitting an alert to the second user.

9. The method of claim 8, wherein processing the text further comprises one of:
correcting errors in the text;
grammatically tagging each word in the text; and
removing from the text each occurrence of a word of a third set of words.

10. The method of claim 9, wherein the third set of words comprises stop words.

11. The method of claim 8, wherein the plurality of keywords comprises at least one of "help," "quick," "rush," "now," "time," "emergency," "immediately," and "pressure."

12. The method of claim 8, wherein identifying the one or more themes of a chat session is based on text from only the second user in the transcript and the plurality of keywords for each theme of the plurality of themes.

13. The method of claim 8, wherein counting the number of occurrences of first words and second words comprises counting the number of first words and second words from only the first user in the transcript.

14. The method of claim 8, wherein the plurality of keywords comprises words relating to at least one of an aversion from answering personal questions and an attempt to steer a conversation.

15. One or more computer-readable non-transitory storage media embodying software that is operable when executed to:
process text in a transcript of a chat session between a first user and a second user, wherein processing the text comprises extracting a stem of each word in the text;
for each theme of a plurality of themes, count, in the transcript, a number of occurrences of each keyword of a plurality of keywords assigned to a theme of a plurality of themes;
automatically identify one or more themes of the chat session based on a comparison of the number of occurrences of each keyword to a first threshold, wherein the one or more themes of the chat session comprises a "forgot password" theme, a "forgot username" theme, and a "bill pay help" theme;
count the number of occurrences of a word of a first set of words and a word of a second set of words in the transcript, wherein the first set of words indicate a social engineering attempt and the second set of words indicate a legitimate chat session; and
assign the transcript into a first group or a second group, wherein assigning the transcript to the first group indicates that the transcript comprises an attempt by the first user to extract at least one of a piece of identification information of a third user or a piece of financial information of the third user from the second user, wherein the third user has not authorized the first user to access the at least one of the piece of identification information or the piece of financial information, the assignment based on:
the one or more identified themes;
a comparison of the number of occurrences of first words to a second threshold;
a comparison of the number of occurrences of second words to the second threshold;
a comparison of the number of occurrences of first words to the number of occurrences of second words;
an identification of a geographical location of the first user as at least one of a location with a high crime tendency and a location without a high crime tendency;
a duration of the chat session;
a type of browser used by the first user to chat with the second user;
a page loading time;
an engagement indication of how the first user initiated the chat session with the second user;
a termination indication of whether the first user or the second user terminated the chat session; and an identification of the second user; and in response to assigning the transcript to the first group, transmit an alert to the second user.

16. The media of claim 15, wherein processing the text further comprises one or more of:

correcting errors in the text;

grammatically tagging each word in the text; and removing from the text each occurrence of a word of a third set of words.

17. The media of claim 16, wherein the third set of words comprises stop words.

18. The media of claim 15, wherein the plurality of keywords comprises at least one of "help," "quick," "rush," "now," "time," "emergency," "immediately," and "pressure."

19. The media of claim 15, wherein identifying one or more themes of the transcript is based on the text from only the second user in the transcript and the plurality of keywords for each theme of the plurality of themes.

20. The media of claim 15, wherein counting the number of occurrences of first words and second words comprises counting the number of first words and second words from only the first user in the transcript.

* * * * *